United States Patent [19]

Brock et al.

[11] Patent Number: 4,643,231
[45] Date of Patent: Feb. 17, 1987

[54] ROTARY DOBBY

[75] Inventors: Josef Brock, Viersen; Paul Surkamp, Kempen, both of Fed. Rep. of Germany

[73] Assignee: W. Schlafhorst & Co., Monchen-Gladbach, Fed. Rep. of Germany

[21] Appl. No.: 724,983

[22] Filed: Apr. 18, 1985

[30] Foreign Application Priority Data

Apr. 18, 1984 [DE] Fed. Rep. of Germany ....... 3414640

[51] Int. Cl.$^4$ .............................................. D03C 1/00
[52] U.S. Cl. ..................................... 139/66 R; 139/76
[58] Field of Search ............................... 139/76, 66 R

[56] References Cited

U.S. PATENT DOCUMENTS

| | | | |
|---|---|---|---|
| 3,804,128 | 4/1974 | Amigues | 139/66 R |
| 4,301,905 | 11/1981 | Brock | 139/76 |
| 4,354,531 | 10/1982 | Surkamp | 139/66 R |

FOREIGN PATENT DOCUMENTS 2841279 11/1979 Fed. Rep. of Germany .... 139/66 R

*Primary Examiner*—Werner H. Schroeder
*Assistant Examiner*—Joseph S. Machuga

*Attorney, Agent, or Firm*—Herbert L. Lerner; Laurence A. Greenberg

[57] ABSTRACT

A rotary dobby for moving a shaft includes a connecting rod connected to the shaft to be moved, the connecting rod having two mutually-opposite wedge detents disposed thereon along a given wedge-detent diametral line, an eccentric disk carried on the connecting rod having a wedge guide extended radially in the eccentric disk, a drive shaft assembly having at least one detent groove formed therein, a coupling wedge disposed between the drive shaft assembly and the eccentric disk, the coupling wedge having an open shifting groove formed therein, two control pieces engageable in the shifting groove, two control rods each being connected to a respective one of the control pieces and being controlled according to a given pattern for pushing one of the control pieces into the shifting groove and for pushing the coupling wedge alternately into the detent groove along the length of the wedge guide when the drive shaft assembly is not rotating and into one of the two wedge detents, and an automatic zero setting device associated with the connecting rod for maintaining the connecting rod and the eccentric disk in a zero position for receiving the coupling wedge.

10 Claims, 13 Drawing Figures

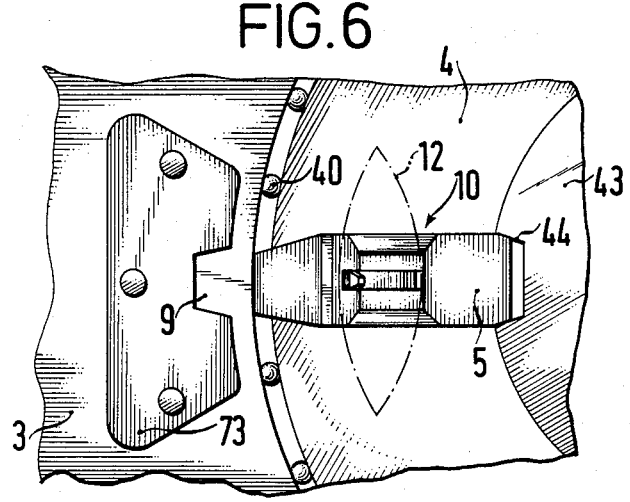
FIG. 6
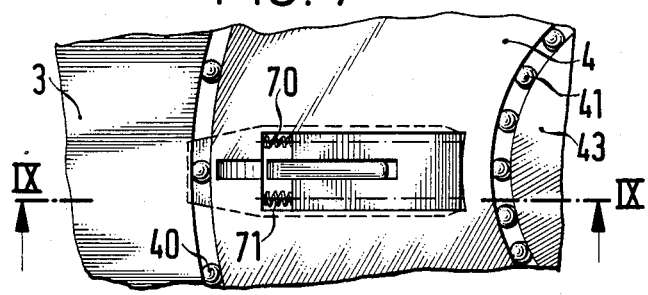
FIG. 7
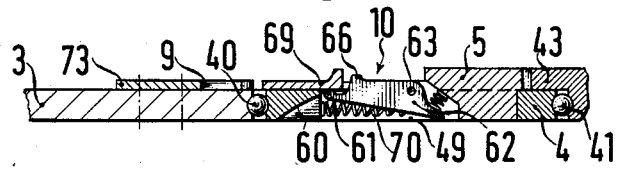
FIG. 8
FIG. 9

ROTARY DOBBY

The invention relates to a rotary dobby for moving a shaft, comprising a connecting rod connected to the shaft to be moved, the connecting rod having two mutually-opposite wedge detents disposed thereon along a given wedge-detent diametral line, an eccentric disk carried on the connecting rod having a wedge guide extended radially in the eccentric disk, a drive shaft assembly having at least one detent groove formed therein, a coupling wedge disposed between the drive shaft assembly and the eccentric disk, the coupling wedge having an open shifting groove formed therein, two control pieces engageable in the shifting groove, and two control rods each being connected to a respective one of the control pieces and being controlled according to a given pattern for pushing one of the control pieces into the shifting groove and for pushing the coupling wedge alternately into the detent groove along the length of the wedge guide and into one of the two wedge detents.

In rotary dobbies or heald machines of this type, shifting difficulties are encountered which prevent an increase of the operational speed of the machine.

Since the zero position is not secured in such devices, increased friction and therefore abrasion and wear occur every time the coupling wedge is shifted.

It is accordingly an object of the invention to provide a rotary dobby which overcomes the hereinafore-mentioned disadvantages of the heretofore-known devices of this general type, to permit an increase of the working speed, and to ensure that the shifting operation causes no wear and does not reduce the reliability of the operation.

With the foregoing and other objects in view there is provided, in accordance with the invention, a rotary dobby or heald machine for moving a shaft, comprising a connecting rod or crank connected to the shaft to be moved, the connecting rod having two mutually-opposite wedge detents disposed thereon along a given wedge-detent diametral line, an eccentric disk of an eccentric device for moving the shaft, being carried on the connecting rod having a wedge guide extended radially in the eccentric disk, a drive shaft assembly having at least one detent groove formed therein, a coupling wedge disposed between the drive shaft assembly and the eccentric disk, the coupling wedge having an open shifting groove formed therein, two control pieces engageable in the shifting groove, two control rods each being connected to a respective one of the control pieces and being controlled according to a given pattern or standard for pushing one of the control pieces into the shifting groove and for pushing the coupling wedge alternately into the detent groove along the length of the wedge guide and into one of the two wedge detents, and an automatic zero setting device for the connecting rod for maintaining the connecting rod and the eccentric disk in a zero position for receiving the coupling wedge.

In accordance with another feature of the invention, the drive shaft assembly includes another disk having the detent groove formed therein. Such an automatic zero position setting device has the capability of enforcing or maintaining a zero position of the connecting rod and the eccentric disk, so that the coupling wedge can shift over in an undisturbed manner and without friction.

In accordance with an added feature of the invention, the zero setting device includes means for rotating the eccentric disk and for holding and forcing the coupling wedge which is guided and supported in the eccentric disk, in a zero position in front of one of the wedge detents.

In accordance with a further feature of the invention, the zero setting device includes a loading device for loading the connecting rod transverse to the wedge-detent diametral line with a force sufficient to rotate the eccentric disk. Accordingly, the connecting shaft is loaded from the side to force the eccentric disk into the zero position, or to hold it in the zero position.

In accordance with again another feature of the invention, the loading device includes an end stop limiting the force loading to eccentric positions between a maximum eccentricity and a neutral eccentricity relative to the wedge-detent diametral line.

In accordance with again an additional feature of the invention, the end stop is adjustable.

In accordance with again a further feature of the invention the connecting rod has an outer surface, and the loading device includes a spring-loaded loading element applied to the outer surface. For instance, a loading-roller can serve as the loading element.

In the above-mentioned normal configuration of a rotary dobby or heald machine, the eccentric disk-rotation mechanism requires only one loading device, because the eccentric disk could only rotate a small amount due to gravitation during the shifting operation. Therefore, in accordance with still another feature of the invention, the outer surface is a lower surface of the connecting rod, and the loading element is disposed below the connecting rod and exerts a force substantially upward from below against the direction of the force of gravity. If the eccentric disk is positioned slightly above the wedge-detent diametral line, the eccentric disk moves to the detent position due to gravity. However, if the eccentric disk is slightly below the wedge-detent diametral line, it is brought to a detent position by the loading device of the eccentric disk rotation device.

In accordance with still a further feature of the invention, there is provided a machine frame, the loading device including a rocker arm having the loading element at an end thereof, a pivot point fixed to the machine frame and another end, and a motion limiting rod connected to the other end, the rod having an adjustable effective length and a compression spring. This structure represents a simple, practical loading device, which can be easily installed at the housing of a rotary dobby.

In accordance with a concomitant feature of the invention, there is provided an end stop device in the form of a stop fixed to the machine frame and an adjustable nut disposed at an end of the rod bearing against the stop.

Among other advantages, the result of the invention is to prevent problems for disturbances and wear due to the shifting of the coupling wedge.

The invention also provides the advantage that the coupling wedge can be constructed so short that it cannot assume an intermediate position, in which it enters a detent before it has left the other detent completely, as is the case in the present state of the art. Consequently, special protective measures against machine trouble due to faulty positioning of the coupling wedge, are superfluous.

Other features which are considered as characteristic for the invention are set forth in the appended claims.

Although the invention is illustrated and described herein as embodied in a rotary dobby, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 6 is a view similar to FIG. 3 of the coupling wedge in the engaged state;

FIG. 7 is a rear view similar to FIG. 4 of the coupling wedge in the engaged state;

FIG. 8 is a view similar to FIG. 5 of the coupling wedge in the engaged state;

FIG. 9 is a longitudinal-sectional view of the coupling wedge taken along the line IX—IX in FIG. 7, in the direction of the arrows;

Figure 1:
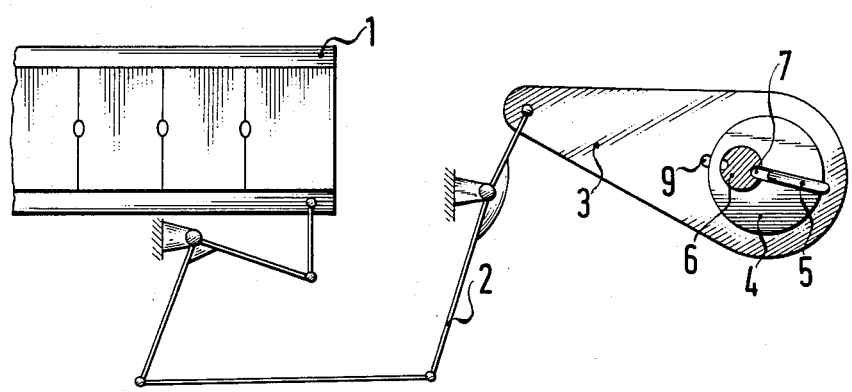
FIG. 1 is a fragmentary, diagrammatic view of a model or pattern of a shaft drive in the lower shed position or setting.

Referring now to the figures of the drawings in detail and first, particularly, to FIG. 1 thereof, there is seen a shaft 1 which is moved into the lower shed position by a connecting rod 3, through a linkage 2.

Figure 2:
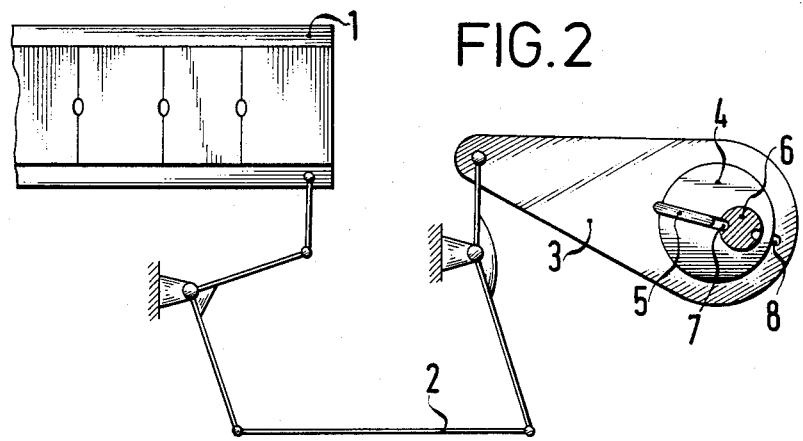
FIG. 2 is a view similar to FIG. 1 of a model or pattern of a shaft drive in the higher shed position or setting.

The connecting rod 3 is supported on an eccentric disk 4. A coupling wedge 5 arrests or retains the eccentric disk 4 against the connecting rod 3. A drive shaft 6 can freely rotate without engaging the eccentric disk 4. However, if the coupling wedge 5 is moved radially, so that it engages in a detent groove 7 of the drive shaft 6, the eccentric disk 4 moves through 180 degrees, until the coupling wedge 5 engages in the second of two detents 8, 9 of the connecting rod 3. In this way the connecting rod 3 moves the shaft 1 into the higher shed position shown in FIG. 2, and the drive shaft 6 can rotate freely again.

According to FIGS. 3 to 8, the coupling wedge 5 is provided with an open shifting or switching groove 10. According to FIGS. 10 to 13, two control or shifter pieces 11, 12 of control or shifter rods 13, 14, respectively, are engageable in the groove 10. Details of the coupling wedge 5 will be described below.

According to FIGS. 10 to 13, the two control rods 13 and 14 are pivotably supported on fixed axes 15, 16, and they are supported at their outer ends by slide bearings 17, 18 connected to a control rod 19, which can slide longitudinally. The control rod 19 articulates with a balance beam 20. Two thin plates 21, 22 are hinged to the balance beam 20 and are connected to feeler needles 23, 24, respectively. The feeler needles 23 and 24 scan or probe a paper card 25 which is guided on a card cylinder 26 having openings through which the needles pass.

As the scanning needles 23, 24 pass through the holes in the paper card 25, these needles extend into the card cylinder 26, and thereby cause the thin plates 21 and 22 to fall against followers 27, 28, which alternatingly move back and forth.

The control rod 19 is pulled to the left by a compression spring 29. The compression spring 29 is braced against a fixed support 30 and against the sliding bearing 18. The sliding bearings 17 and 18 are spring mounted on the control rod 19 by the interposition of collars 31 to 34 and compression springs 35, 36, in order to transfer the result of the scanning performed by the needles 23, 24 onto the coupling wedge 5. The balance beam 20 is in a rest position at least at one of the two fixed supports 37, 38.

Figure 10:
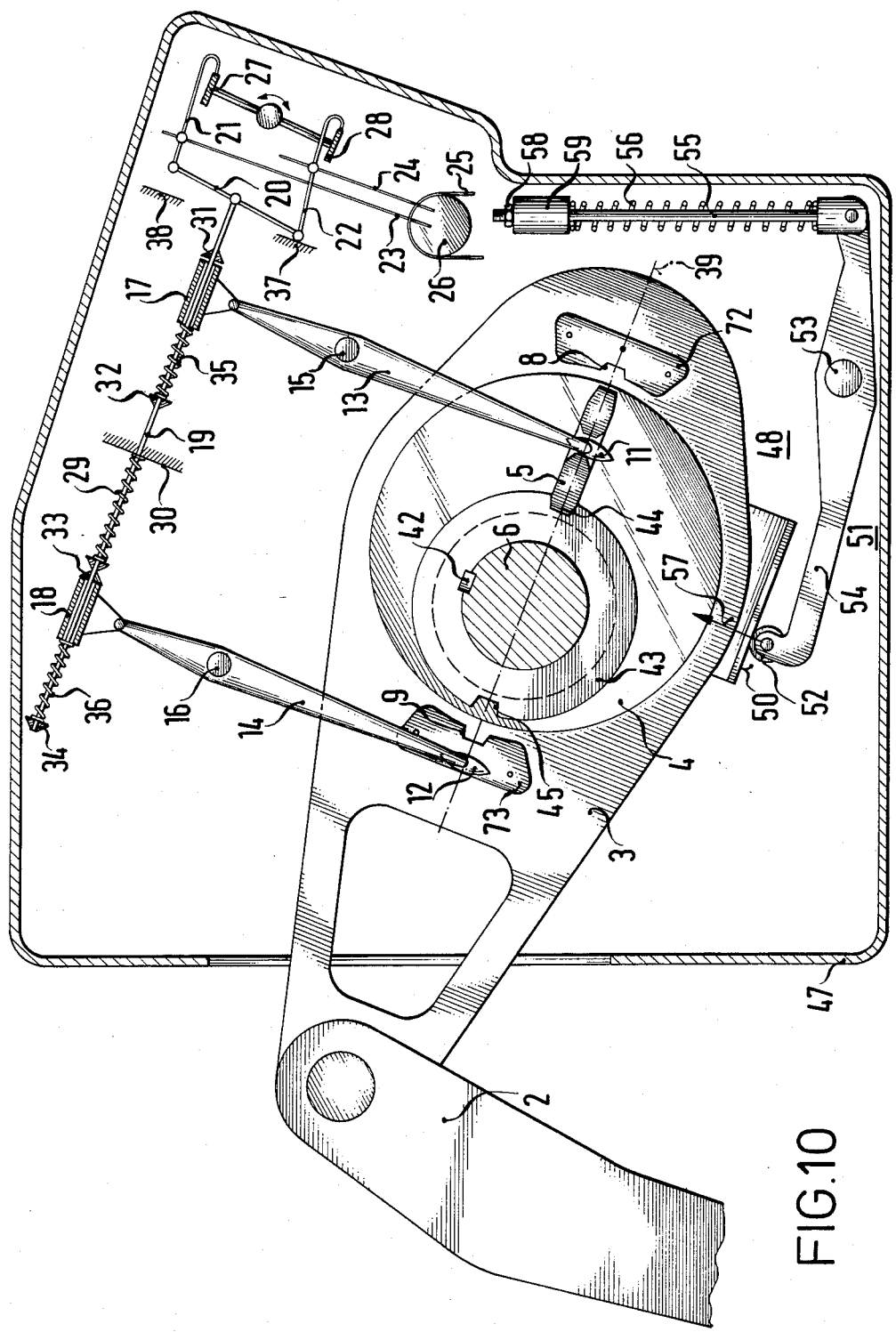
FIG. 10 is a fragmentary, partially cross-sectional view of a rotary dobby or heald machine leaving the lower shed position or setting.
Figure 13:
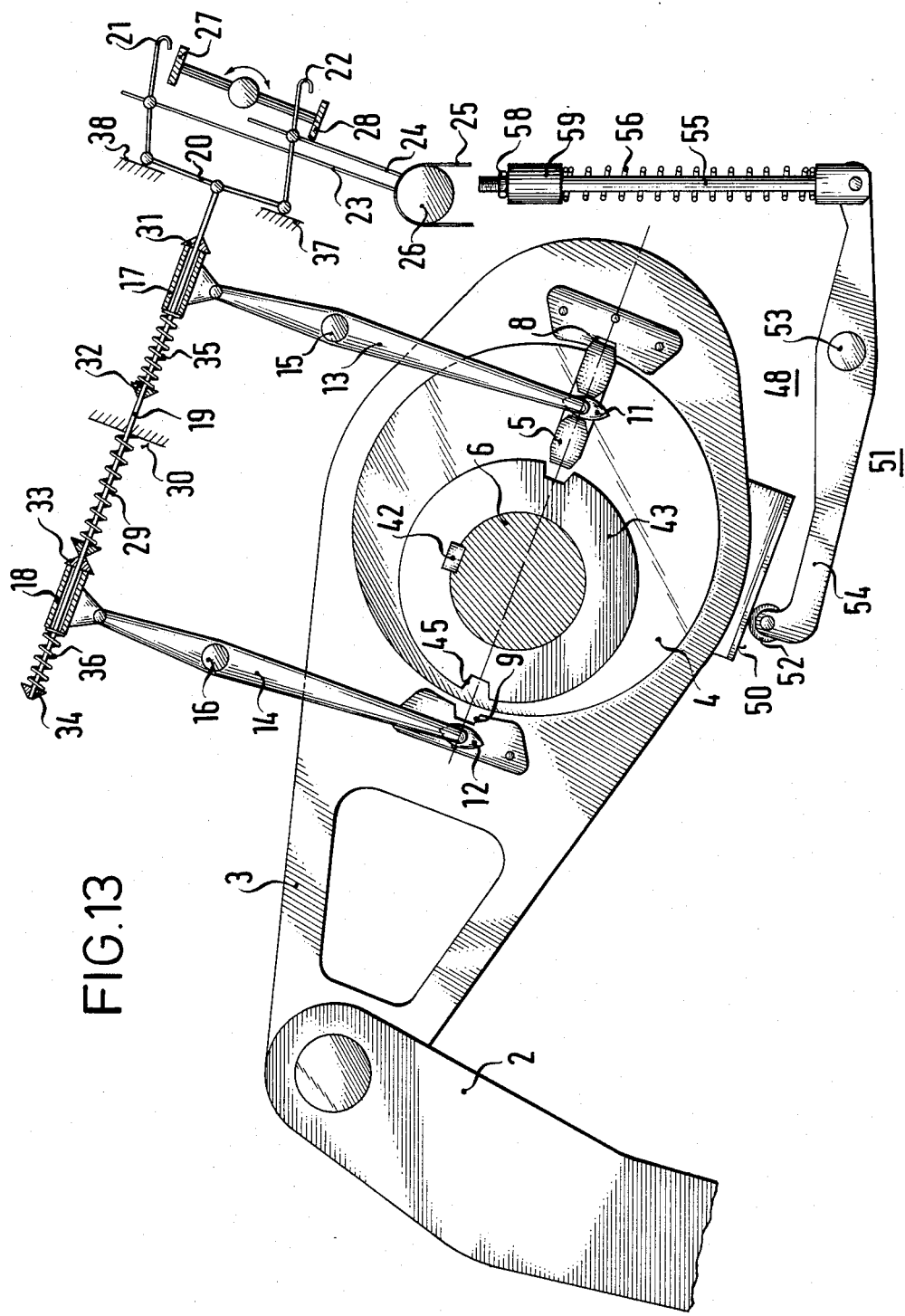
FIG. 13 is yet another view similar to FIGS. 10-12, showing the machine when reaching the lower shed position again.

According to FIGS. 10 and 13, the two detents 8, 9 for the wedge are fixed on the connecting rod or crank 3, and are disposed opposite each other along a wedge-detent diametral line 39.

Figure 5:
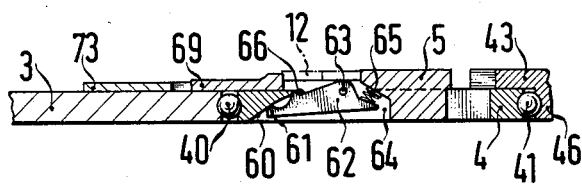
FIG. 5 is a fragmentary, longitudinal-sectional view of the coupling wedge.

The eccentric disk 4 is freely movably supported in the connecting rod 3 with the aid of roller bearings 40, shown in FIGS. 3 to 9. According to FIGS. 10 to 13, a disk 43 is fixed to the drive shaft 6 by means of a key 42. The disk 43 is provided with two diametrically opposite grooves 44, 45 for the coupling wedge 5. As shown in FIG. 5, the eccentric disk 4 is freely movably supported on a concentric shoulder 46 of the disk 43 through the use of a roller bearing 41 which is shown in FIGS. 4, 5 and 7 to 9.

The above-mentioned parts are disposed in the interior of a housing 47 which is shown in an open condition in the drawing. The connecting rod 3 extends from the housing 47 in order to connect with the linkage 2. Additionally, the housing 47 also contains an automatic zero-setting device for the connecting rod 3, designated as a whole by reference numeral 48. The zero-setting device 48 serves the purpose of moving a wedge guide 49, which is clearly shown in FIG. 3 to be radially disposed in the eccentric disk 4. The device 48 moves the guide 49 by exerting an upward force on connecting rod 3 and consequently rotating eccentric 4 and guide 49 to a point where it is aligned with one of the wedge detents 8, 9. The zero setting or eccentric disk rotating device 48 is formed of a flat rolling surface 50 which is disposed on the lower surface of the connecting rod 3, and a loading device which is designated as a whole with reference numeral 51.

The loading device 51 has the capability of loading the connecting rod 3 transversely to the wedge-detent diametral line 39, with a force sufficient to rotate the eccentric disk 4.

More specifically, the loading device 51 is provided with a loading element 52 in the form of a loading roller, which is disposed at the end of a rocker arm 54, having a fixed pivot point 53 at the machine frame. The other end of the rocker arm 54 is connected to a rod 55, which limits motion and which has a length that is adjustable. A compression spring 56 is provided on this motion limiting rod 55 which transmits the loading force.

The direction of the force transmitted by the loading element 52 onto the rolling surface 50 is indicated by an arrow 57. A large component of the force is directed against the direction of the force of gravitation and perpendicular to the wedge-detent diametral line 39.

The loading device 51 is provided with an adjustable end stop, in form of a stop 59 which is fixed to the frame and an adjustable nut 58 which is disposed at the end of the motion limiting rod 55. The end stop is set in such a way that the action force of the loading device 51 with respect to the wedge-detent diametral line 39, is limited to eccentric positions between a non-illustrated maximum eccentricity and a neutral eccentric position such as is shown in FIGS. 10 and 13. The maximum eccentricity is reached when the wedge 5 is perpendicular to the line 39 and is in a direction facing toward the surface 50. For instance, FIG. 10 shows that the above-mentioned neutral eccentric position has just been reached, and the adjustment nut 58 lies at the stop 59, so that beyond the neutral eccentric position no further force is applied by the loading device onto the connecting rod 3.

The eccentric disk 4 is freely rotatable about the drive shaft 6 when the coupling wedge 5 is disengaged. Since it is eccentric, gravity will tend to rotate the eccentric disk 4 clockwise from the position shown in FIG. 10, so that its center of gravity is at the lowest point. This rotation of the eccentric disk 4 would slide the connecting rod 3 down and to the left since the eccentric disk 4 rotates about the drive shaft 6 and the position of the drive shaft 6 will not change. Therefore, the rotation of the eccentric disk 4 and the sliding of the connecting rod 3 are linked. Similarly, if the roller 52 stops the surface 50 and therefore the connecting rod 3 from sliding, it will stop the eccentric disk 4 from rotating.

The coupling wedge 5, which is especially clearly shown in FIGS. 3 to 9, is supported in the wedge guide 49 of the eccentric disk 4, so that it can slide longitudinally. The wedge guide 49 is an approximately rectangular perforation in the eccentric disk 4, which according to FIG. 4 extends radially outwardly forming a sliding surface 60 of limited width. The sliding surface 60, according to FIG. 5, serves as a sliding surface for an engagement nose 61 of a locking pawl 62. The locking pawl 62 pivots about an axis 63 is an opening 64 formed in the coupling wedge 5, and is loaded by a compression spring 65. The locking pawl 62 is also provided with a cam surface 66.

Certain portions of the coupling wedge 5 lie on the eccentric disk 4 and certain portions on the connecting rod 3. This relates to lateral portions 67, 68 which serve to guide the wedge, and a detenting portion 69 which serves for engaging in the wedge detents 8, 9. FIGS. 7 and 9 indicate that the coupling wedge 5 is provided with two longitudinal bores or holes in which compression springs 70, 71 are respectively retained. The compression springs have one end which bears against the coupling wedge 5 and another end which bears against the radially outwardly positioned wall of the wedge guide 49. The springs try to slide the coupling wedge in the direction toward the drive shaft 6.

According to FIG. 10, the two wedge detent positions 8 and 9 are located in plates 72, 73, respectively, which are riveted to the connecting rod 3.

In the lower shed position shown in FIG. 10, the scanning needles 23 and 24 have found holes in the paper card 25, so that the thin plates 21 and 22 are pulled down against the followers 27 and 28. The followers therefore act on the balance beam 20, and lift it alternatingly from the supports 37 and 38. The control rod 19 is therefore pulled toward the right, as shown in FIG. 10. The control rod 19 thus takes along the control rods 13 and 14, so that the coupling wedge 5 is pulled out of the wedge detent 8 and engages the detent groove 44 of the disk 43. The engagement takes place when the disk 43 is not moving, because the drive shaft 6 stops its rotation after each half turn for a short moment. FIGS. 7 to 9 show the position of the coupling wedge 5 in the engaged state, after the control pieces 11, 12, respectively, have slipped out of the control groove 10. The engagement nose 61 of the locking pawl 62 is engaged behind the radially outer limiting wall of the wedge guide 49, so that the coupling wedge 5 is held securely in the detent groove 44, not only by the force of the springs 70, 71, but also by mechanical locking means, even if centrifugal forces are acting on the coupling wedge, during subsequent rotation of the eccentric disk 4.

Figure 3:
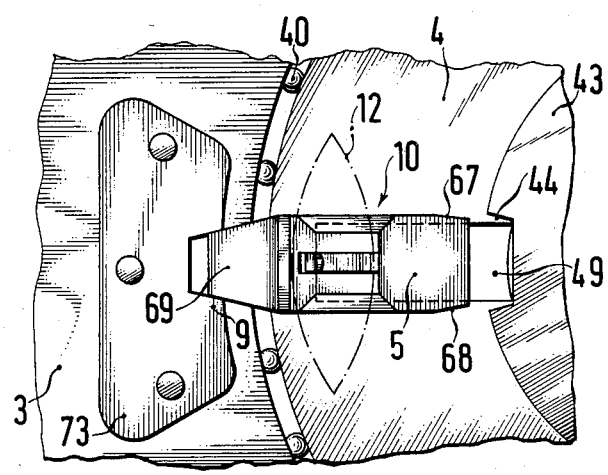
FIG. 3 is a fragmentary, front-elevational view of the engaged coupling wedge.
Figure 4:
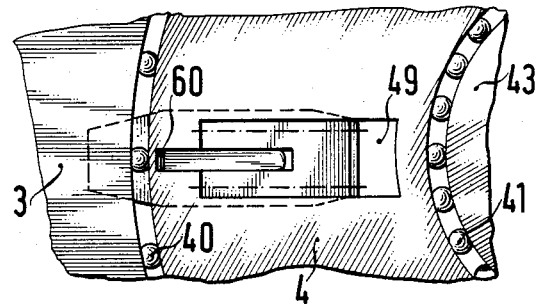
FIG. 4 is a fragmentary, rear-elevational view of the coupling wedge.
Figure 11:
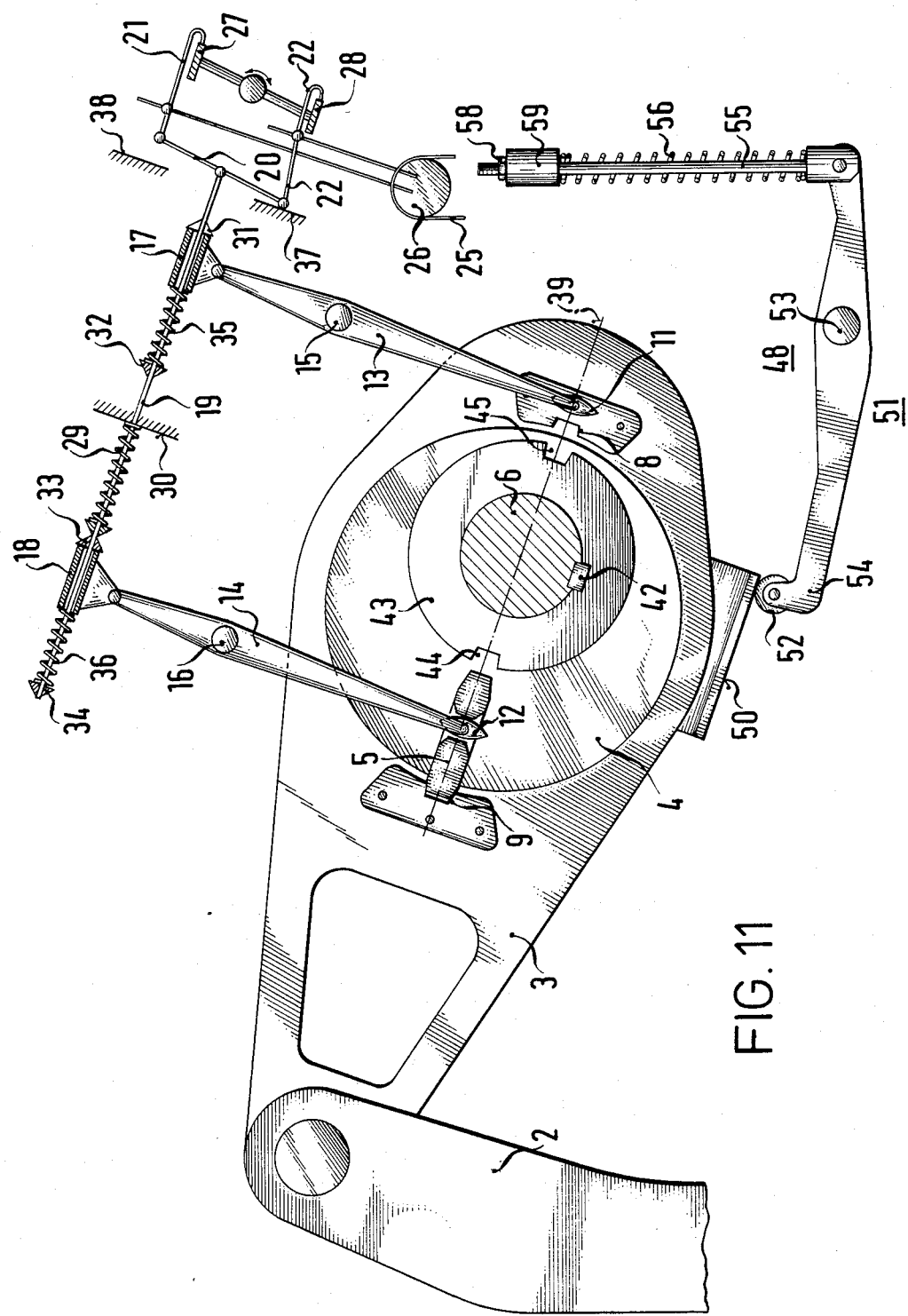
FIG. 11 is a view similar to FIG. 10, showing the machine after reaching the higher shed position or setting.

After a half turn of the eccentric disk 4, the control piece 12 finds its way into the control groove 10 of the coupling wedge 5, unlocks the locking pawl 62 by pressing down the cam surface 66, and directs the coupling wedge 5 into the wedge detent 9. The higher shed position which is illustrated in FIGS. 3 and 11 has thus been reached.

Figure 12:
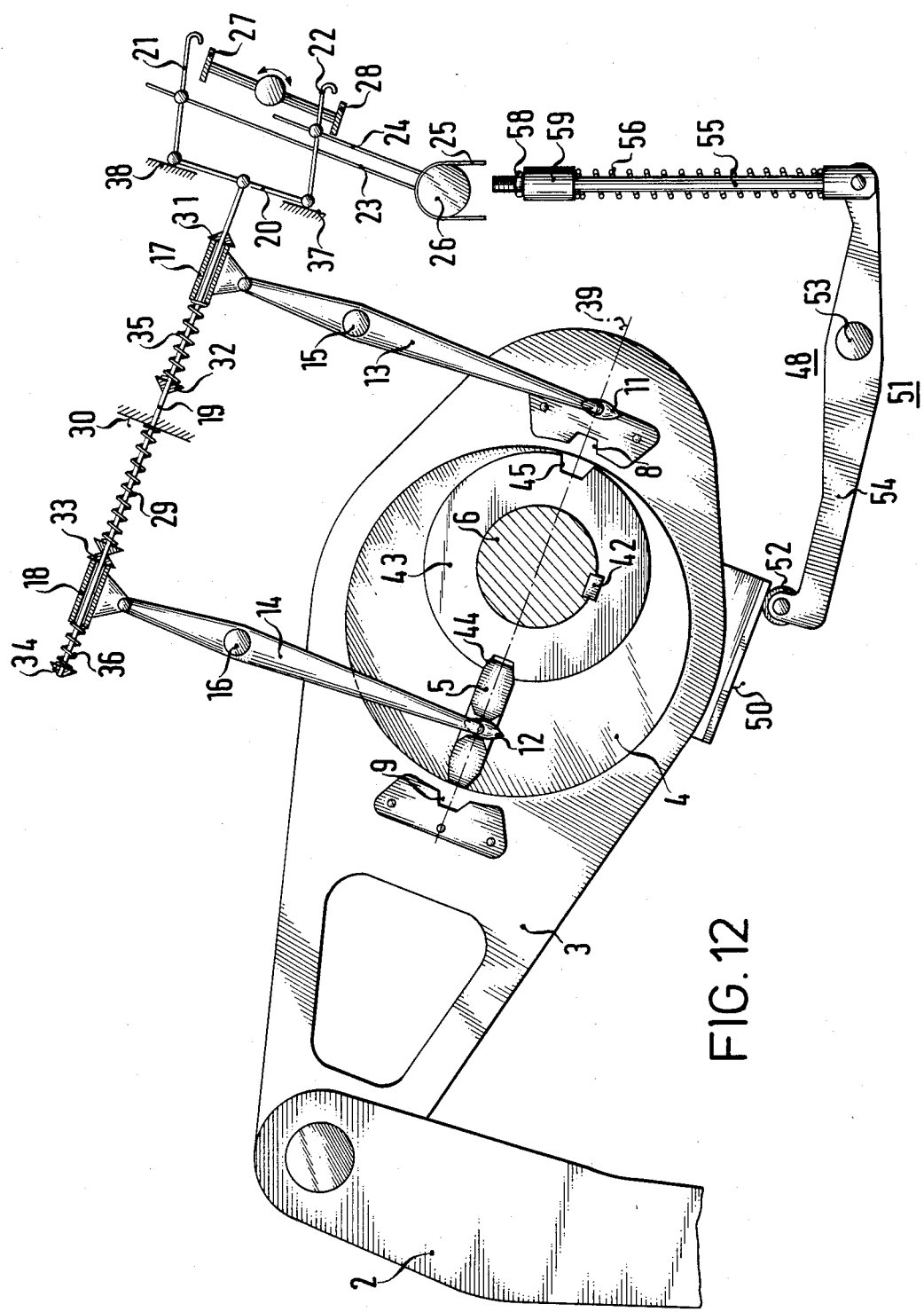
FIG. 12 is another view similar to FIGS. 10 and 11, showing the machine when leaving the higher shed position or setting.

The higher shed position is maintained until, according to FIG. 12, the scanning or feeler needles 23, 24 are retracted from the card cylinder and come to rest on the paper card 25.

In this way, the thin plates 21, 22 loose contact with the followers 27, 28, so that the balance beam 20 moves toward the stops or supports 37, 38, due to the action of compression spring 29. Simultaneously, the compression spring 29 moves the control rod 19 to the left and the two control rods 13, 14 swing counter clockwise. The control piece 12 of the control rod 14 therefore moves the coupling wedge 5 into one of the two detent grooves 44, 45. In the embodiment according to FIGS. 6 and 12, this happens to be the detent groove 44. The coupling wedge 5 and the eccentric disk 4 are therefore taken along by the rotating disk 43, and the higher shed position shown in FIG. 11 changes to the lower shed position shown in FIG. 13. As long as the two scanning needles 23, 24 cannot fall through, the lower shed position remains unchanged and stable as shown in FIG. 13.

FIG. 5 shows the coupling wedge 5 with the control piece 12 in the engaged position. The control piece 12 has unlocked the locking pawl 62 by depressing the cam surface 66. Under the action of the compression spring 65, the locking pawl 62 is engaged again each time, as soon as a control piece 11 or 12 is withdrawn from the shifting groove 10 after the coupling wedge has become engaged.

During each shifting of the coupling wedge 5, the automatic zero-setting device ensures that there is no relative motion between the connecting rod or crank and the eccentric disk. Coupling or shifting disturbances are therefore prevented In the zero position, elements 3, 4 and 6 are at a standstill. When the wedge 5 is between the positions 8 and 9, the disc 4 is prevented from rotating by the roller 52 adjacent the surface 50. The spring 56 only presses the roller 52 against the surface 50 if the disc 4 tries to move.

The invention is not limited to the illustrated and described embodiment which was used as an example.

We claim:

1. Rotary dobby for moving a shaft, comprising a connecting rod connected to the shaft to be moved, said connecting rod having two mutually-opposite wedge detents disposed thereon along a given wedge-detent diametral line, an eccentric disk carried on said connecting rod having a wedge guide extended radially in said eccentric disk, a driven shaft assembly having at least one detent groove formed therein, a coupling wedge disposed between said drive shaft assembly and said eccentric disk, said coupling wedge having an open shifting groove formed therein, two control pieces engageable in said shifting groove, two control rods each being connected to a respective one of said control pieces and being controlled according to a given pattern for pushing one of said control pieces into said shifting groove and for pushing said coupling wedge alternately into said detent groove along the length of said wedge guide when said drive shaft assembly is not rotating and into one of said two wedge detents, and an automatic zero settng device associated with said connecting rod for maintaining said connecting rod and said eccentric disk in a zero position for receiving said couplng wedge.

2. Rotary dobby according to claim 1, wherein said drive shaft assembly includes another disk having said detent groove formed therein.

3. Rotary dobby according to claim 1, wherein said zero setting device includes means for rotating said eccentric disk and for holding said coupling wedge in front of one of said wedge detents.

4. Rotary dobby according to claim 3, wherein said zero setting device includes a loading device for loading said connecting rod transverse to said wedge-detent diametral line with a force sufficient to rotate said eccentric disk.

5. Rotary dobby according to claim 4, wherein said loading device includes an end stop limiting said force loading to eccentric positions between a maximum eccentricity and a neutral eccentricity relative to said wedge-detent diametral line.

6. Rotary dobby according to claim 5, wherein said end stop is adjustable.

7. Rotary dobby according to claim 4, wherein said connecting rod has an outer surface, and said loading device includes a loading element applied to said outer surface and a spring biasing said loading element against said outer surface.

8. Rotary dobby according to claim 7, wherein said outer surface is a lower surface of said connecting rod, and said loading element is disposed below said connecting rod and exerts a force substantially upward from below against the direction of the force of gravity.

9. Rotary dobby according to claim 7, including a machine frame; said loading device including: a rocker arm having said loading element at an end thereof, a pivot point fixed to said machine frame and another end; and a motion limiting rod connected to said other end, said rod having an adjustable effective length and said spring being a compression spring disposed on said rod.

10. Rotary dobby according to claim 9, including an end stop device in the form of a stop fixed to said machine frame and an adjustable nut disposed at an end of said rod bearing against said stop.

* * * * *